Figure 1:
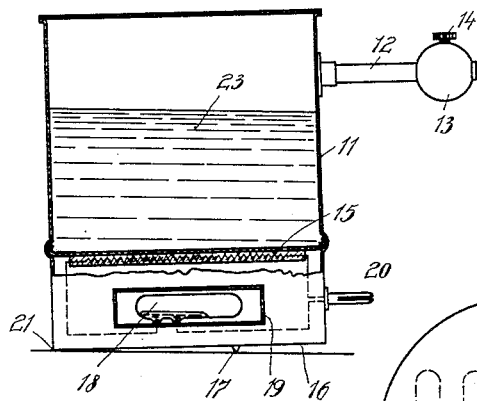

Jan. 22, 1929.

E. RICCI DEL RICCIO 1,699,610

ELECTRIC HEATING AND COOKING APPLIANCE

Filed Dec. 20, 1927

Inventor
Eduardo Ricci del Riccio
by Knight Bro.
attorney

Patented Jan. 22, 1929.

1,699,610

UNITED STATES PATENT OFFICE.

EDUARDO RICCI DEL RICCIO, OF ROME, ITALY.

ELECTRIC HEATING AND COOKING APPLIANCE.

Application filed December 20, 1927, Serial No. 241,356, and in Germany December 28, 1926.

My invention relates to electric heating and cooking appliances.

The object of my invention is to provide a device for automatically interrupting the heating circuit to such appliances in order to prevent the heating resistance becoming overloaded and destroyed should the liquid have evaporated or drained from the vessel.

My invention consists substantially in providing at a suitable place of the vessel containing the liquid a tipping axis around which the vessel may tip into one or the other end position. Outside the center of gravity of the vessel, receptacle or container, pot or pan, filled with a liquid or empty, there is provided a special weight. When the vessel is filled with a liquid the vessel is turned into one of its end positions by the weight of the liquid. When the vessel has been drained completely or substantially the separate counterweight overbalances and the vessel is tipped into the other end position. When the vessel is turned into this latter position the heating circuit is automatically broken.

An embodiment of my invention is illustrated by way of example in the drawing affixed hereto and forming part of my specification.

The drawings represent in

Figure 2:
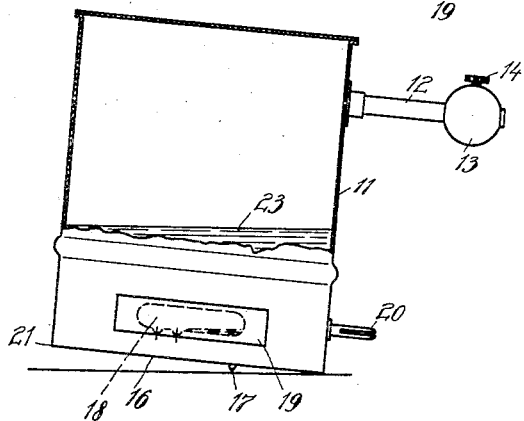

Fig. 1, a sectional elevation of the appliance with heating circuit closed,

Fig. 2, a similar view, but with the heating circuit open, and

Figure 3:
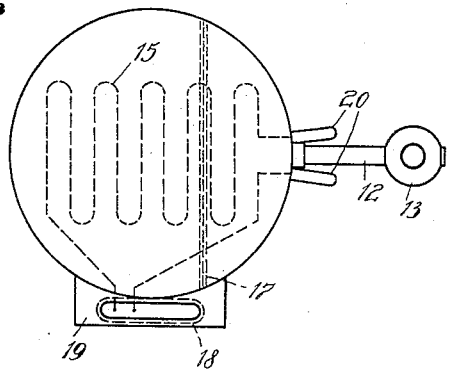

Fig. 3, a plan of my improved appliance.

Like parts are indicated by like letters of reference throughout all the figures of the drawing.

Referring to the drawing it will be observed that at the vessel, tank, pot or pan 11 containing the liquid there is provided a handle 12 fitted with a sliding weight 13 adapted to be fixed in position by a screw 14. At the underside of the inner bottom of the vessel 11 there is provided the heating resistance 15 of the usual construction. At the lower bottom 16 of the vessel 11 there is provided a projection 17 serving as a tipping axis for the vessel and located laterally of the vertical axis through the center of gravity of the vessel. This projection may consist of a knife-edge embossed out of the material of the bottom of the vessel, of a straight wire soldered to the bottom, or of two embossed or soldered small feet the connecting line of which is located outside the vertical plane through the center of gravity of the vessel. On the outside of the vessel at some suitable place there is provided a mercury tipping switch 18 housed in a box of sheet metal or the like and connected in the circuit of the heating resistance 15 and the contact pins 20.

My improved water heating or cooking appliance functions in the following manner: when the vessel 11 is filled with a liquid it takes up the position shown in Fig. 1 in which the point 21 of the bottom edge of the vessel rests upon the table or the like. The weight of the liquid 23 overbalances the counterweight 13 upon the handle 12. The mercury in the glass tube 18 flows towards the left-hand side and connects the supply leads so that the heating resistance is connected in circuit and the liquid 23 is heated.

If now the liquid in the vessel evaporates gradually or drains out of or is scooped out of the vessel, the torque exerted by the weight of the liquid becomes gradually less and less until it is finally overcome by the torque of the weight 13. The vessel 11 then tips into the position illustrated in Fig. 2 of the drawings. The mercury in the switch 18 now flows towards the right, uncovers the supply leads and automatically breaks the circuit so that no overheating and destruction of the heating element 15 can take place. By varying the position of the weight 13 on the handle 12 the time may be set when the tipping and switching out should take place.

It will be understood that various changes and modifications may be made within the scope of my claims and without departing from the spirit of my invention and I desire it to be distinctly understood that these are intended to be covered by my appended claims. The separate weight 13 may, for instance, be located between the inner and the lower bottom of the vessel 11 in the compartment containing the heating units, or at the portable connecting base or plug. The mercury switch may be replaced by any other suitable switch with instantaneous action, such as a snap switch the handle of which is turned when the vessel tips over. The switch may, of course, be provided at any other suitable place than that shown in the drawings. It will be understood that the vessel need not necessarily tip around an axis located at the bottom, but that this axis might be provided at any other suitable place.

My invention is particularly applicable to coffee percolators.

I claim as my invention:

1. A cooking appliance comprising in combination an electrically heated vessel, a tipping pivot element upon said vessel, a weight fixed to said vessel and being located laterally of the vertical axis through the center of gravity of the appliance, and means actuated by the tipping of the vessel for breaking the heating circuit.

2. A cooking appliance comprising in combination an electrically heated vessel, a tipping pivot element upon said vessel, a lever arm protruding from said vessel and having a weight fixed thereon to tip the vessel on said pivot element, and means actuated by the tipping of the vessel for breaking the heating circuit.

3. A cooking appliance comprising in combination an electrically heated vessel, a tipping pivot element upon said vessel, a lever arm protruding from said vessel and having a weight adjustably fixed thereon to tip the vessel on said pivot element, and means actuated by the tipping of the vessel for breaking the heating circuit.

4. A cooking appliance comprising in combination an electrically heated vessel, a tipping pivot element upon said vessel, a weight fixed to said vessel and being located laterally of the vertical axis through the center of gravity of the appliance, and a mercury switch actuated by the tipping of the vessel for breaking the heating circuit.

5. A cooking appliance comprising in combination an electrically heated vessel, a tipping pivot element fixed upon the bottom of said vessel, a weight fixed to said vessel and being located laterally of the vertical axis through the center of gravity of the appliance, and means actuated by the tipping of the vessel for breaking the heating circuit.

6. A cooking appliance comprising in combination an electrically heated vessel, a tipping ridge provided at the bottom of the vessel laterally of the vertical axis through the center of gravity of the vessel, a lever arm extending away from the vessel on the side of the ridge opposite to that on which said center of gravity is located, a weight adjustably fixed upon said arm to tip the appliance when its content is reduced, and a switch adapter to break the heating current when the weight has tipped the vessel.

In testimony whereof I affix my signature.

EDUARDO RICCI del RICCIO.